United States Patent [19]

Hambleton

[11] Patent Number: 5,428,900

[45] Date of Patent: Jul. 4, 1995

[54] SHEET SCRIBING JIG

[76] Inventor: Jay G. Hambleton, #2-1675 Thayer Court, Kelowna, B.C., Canada, V1Y 8M2

[21] Appl. No.: 213,725

[22] Filed: Mar. 16, 1994

[51] Int. Cl.6 .......................... B43L 7/00; B23Q 16/00
[52] U.S. Cl. ........................................ 33/32.7; 33/32.1; 33/403; 33/568
[58] Field of Search ...................... 33/32.1, 32.2, 32.3, 33/32.4, 32.7, 33, 41.6, 403, 562, 566, 568, 573; 269/211, 221; 83/468, 468.2, 468.7

[56] References Cited

U.S. PATENT DOCUMENTS

| 3,304,613 | 2/1967 | Shawhan | 33/32.2 X |
| 3,854,214 | 12/1974 | Crocket . | |
| 4,038,751 | 8/1977 | Albright | 33/403 X |
| 4,570,345 | 2/1986 | Cattadoris . | |
| 5,291,663 | 3/1994 | Briglia et al. | 33/669 |

FOREIGN PATENT DOCUMENTS 0294755  10/1991  Germany .............................. 33/562

Primary Examiner—Alvin Wirthlin
Attorney, Agent, or Firm—Dalesman & Company

[57] ABSTRACT

A jig which receives a sheet in a selected position to accurately scribe it in a straight line. The jig has front and rear panels which form a vertical slit between them in which the sheet is received. The bottom of the sheet sits on an elongated support bar which extends horizontally in the slit and the line is scribed by running a scribing tool along the upper scribing edge of the front panel. The support bar has a pair of spaced studs which extend out through matching openings in the front panel to allow the support bar to be manually moved between a number of different vertical positions to select the distance the line is scribed from the bottom of the sheet. The openings in the front panel each have a number of spaced slots extending sideways which provide a pair of notches in which the studs are seated in each position. The studs are threaded to receive a retaining knob which are tightened against the front panel to secure the support bar in the selected position.

6 Claims, 2 Drawing Sheets

SHEET SCRIBING JIG

BACKGROUND OF THE INVENTION

This invention relates to a jig or device in which sheet material is received in a selected position to accurately scribe it in a straight line.

While this jig is very convenient for scoring a sheet of cardboard to make a folded box or lid, it can also be used for marking, scoring or severing sheets of various materials and the term "scribing" is used herein to include all of the above.

In the past, numerous devices or arrangements have been used to facilitate marking and/or cutting of sheet material. In many cases, such as seen in U.S. Pat. No. 4,570,345 to Cattadoris, the workpiece is held in a fixed position and a guide is moved to a desired position to scribe the line. In some other cases, such as shown in U.S. Pat. No. 3,854,214 to Crocket, the guide is stationary and the position of the workpiece itself is adjustable. However, these previous devices are relatively difficult to use with accuracy and there is need for a device which can be quickly and easily used to scribe a line a selected distance from the bottom of a sheet.

SUMMARY OF THE INVENTION

Accordingly, it is an object of the present invention to at least partially overcome the disadvantages of the prior art by providing a sheet scribing jig in which a sheet is received in a selected position to scribe a line a predetermined distance from the bottom of the sheet.

To this end, in one of its aspects, the invention provides a jig for scribing a sheet along a straight line, the sheet having a bottom and the line being spaced a selected distance from the bottom of the sheet, comprising rear panel means, front panel means having a straight upper scribing edge, the front panel means extending substantially parallel to and spaced from the rear panel means to form a slit therebetween, the slit being of sufficient width and having an open top to receive the sheet therein, and support means located in the slit formed between the front and rear panel means to support the sheet thereon with a lower portion of the sheet received in the slit and an upper portion of the sheet protruding from the slit, the support means having a plurality of predetermined positions to provide the selected distance between the support means and the upper scribing edge of the front panel means.

Further objects and advantages of the invention will appear from the following description taken together with the accompanying drawings.

DETAILED DESCRIPTION OF THE INVENTION

Figure 3:
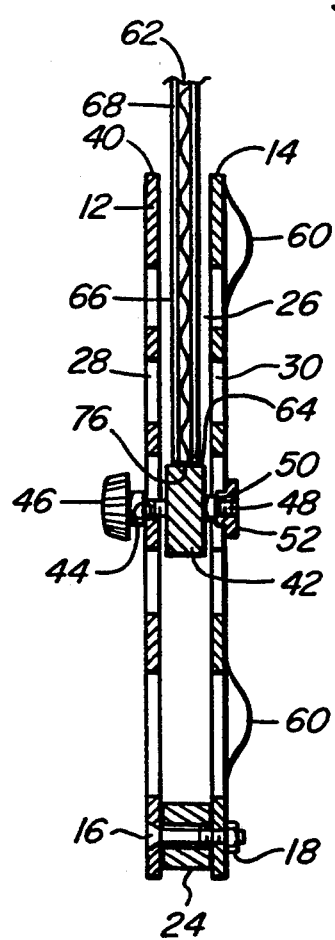
FIG. 3 is sectional view of the sheet scribing jig along line 3—3 in FIG. 2.
Figure 2:
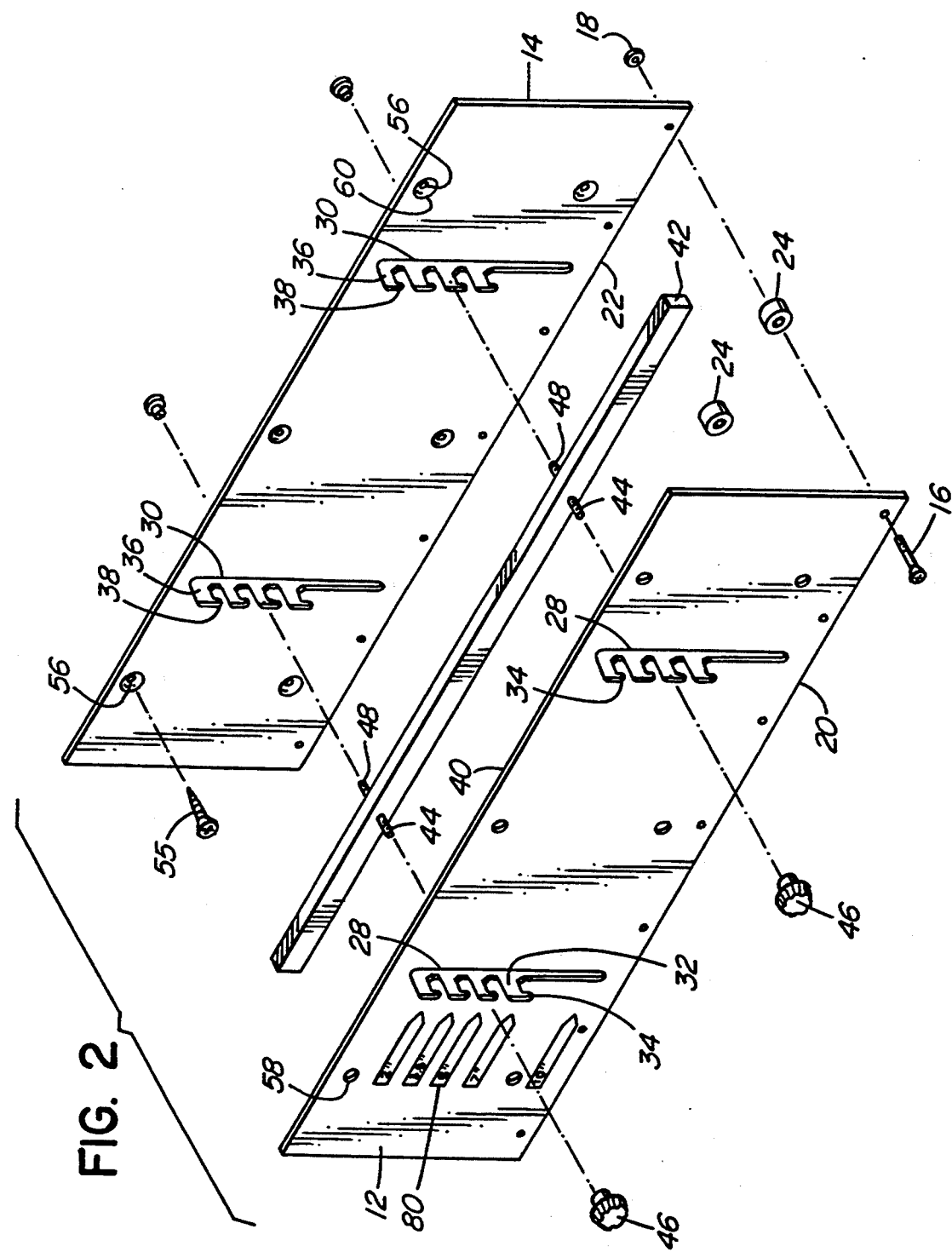
FIG. 2 is an exploded isometric view of the sheet scribing jig seen in FIG. 1.

Reference is first made to FIGS. 2 and 3 which show how a sheet scribing jig 10 according to a preferred embodiment of the invention is made. A rectangular front panel 12 is secured to extend parallel to and spaced from a rectangular rear panel 14 by a number of screws 16 with nuts 18 spaced along the bottoms 20, 22 of the panels 12, 14. The screws 16 extend through spacer washers 24 mounted between the panels 12, 14 to form an open ended slit 26 extending between the front panel 12 and the rear panel 14 which is equal in width to the spacer washers 24.

In this embodiment, each of the front and rear panels 12, 14 have a spaced pair of vertically extending openings 28, 30 therethrough. As can be seen, the openings 28, 30 are matching and the openings 28 in the front panel 12 are aligned with the openings 30 in the rear panel 14. Each of the openings 28 in the front panel 12 have several spaced slots 32 extending sideways therefrom and each slot 32 has a downward extending notch 34 at its outer end. Similarly, each of the openings 30 in the rear panel 14 have matching slots 36 and notches 38 extending therefrom. The openings 28, 30 are located so that each pair of notches 34, 38 in each panel 12, 14 is a different predetermined distance below the straight upper scribing edge 40 of the front panel 12.

An elongated sheet support bar 42 is mounted in the slit 26 between the front and rear panels 12, 14 with a first pair of spaced studs 44 extending forwardly through the vertically extending openings 28 in the front panel 12. The support bar 42 has a rectangular cross section and is slightly thinner than the spacer washers 24 so that it moves freely in the slit 26. The opening 28 in the front panel 12 and the first pair of spaced studs 44 are made to extend forwardly so the studs 44 are easily movable between different vertical positions in which they are seated in different pairs of the notches 34 in the openings 28 in the front panel 12. Each of the first pair of studs 44 is threaded to receive a threaded retaining knob 46 which facilitate movement of support bar 42 and can be tightened against the front panel 12. This secures the support bar 42 in place after one of the vertical positions has been selected and provides strength to the overall structure.

In this embodiment, the sheet support bar 42 also has a second pair of spaced studs 48 extending rearwardly through the vertically extending openings 30 in the rear panel 14. Each of these studs 48 is threaded from a shoulder 50 against which a nut 52 is tightened to form an enlarged head which extends on the outside of the rear panel 14. This provides the sheet scribing jig 10 with additional strength and limits the width of the slit 26 between the front and rear panels 12, 14.

Figure 1:
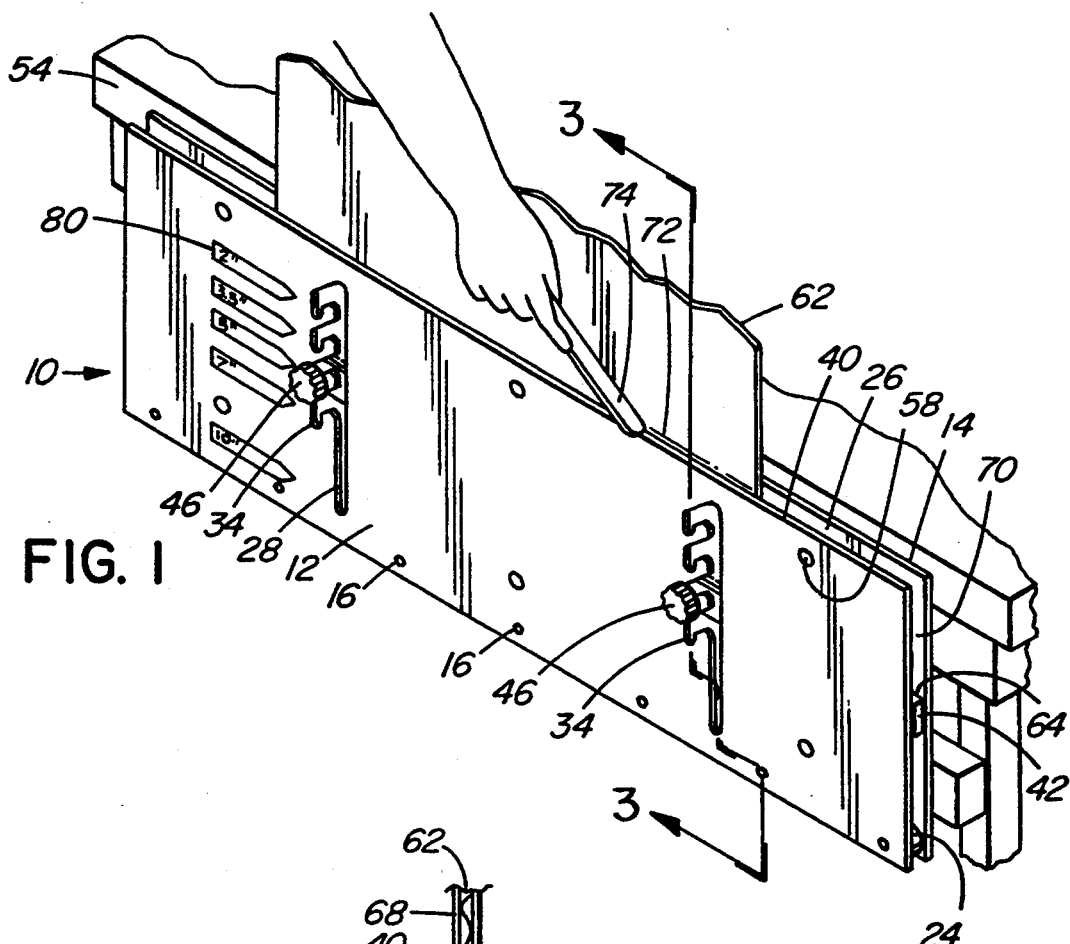
FIG. 1 is an isometric view of a sheet scribing jig according to a preferred embodiment of the invention mounted on the front of a work table.

As seen in FIG. 1, the sheet scribing jig 10 is normally mounted on a wall or table 54 with the sheet receiving slit 26 extending substantially vertically and the elongated support bar 42 extending substantially horizontally. While it is possible to mount it with the slit 26 extending on an angle towards the front or rear, this is normally less convenient. Mounting screws 55 extend through holes 56 in the rear panel 14 and are tightened into place by a screwdriver (not shown) inserted through larger diameter aligned holes 58 in the front panel 12. Indents 60 extending rearwardly around the screw holes 56 in the rear panel 14 abut against the wall or table 54 and ensure there is enough clearance for movement of the nuts 52. While the front and rear panels 12, 14 and the support bar 42 are normally made of aluminum, other suitable materials such as steel, plastic or wood can be used when appropriate.

In use, the sheet scribing jig 10 is mounted as shown in FIG. 1 and described above. After the knobs 46 are loosened, one knob 46 is held in each hand to move the sheet support bar 42 to a selected horizontal position with the studs 44, 48 seated in matching pairs of the notches 34, 38 in the front and rear panels. The support bar is then secured in this selected position by tightening the retaining knobs 46. In the embodiment shown, the jig 10 is used to score a sheet of corrugated cardboard 62 along lines a selected distance from its edges preparatory to folding and stapling it to form a box or lid having the selected depth. Thus, each pair of notches 34 are marked 80 to indicate the distance between the top 64 of the sheet support bar 42 and the upper scribing edge 40 of the front panel 12 when the first pair of studs 44 are seated in that particular pair of notches 34. While the notches 34 are shown marked 80 with different standardized depths used to form shallow boxes for framed pictures, of course other dimensions can be used for other scribing applications. The sheet of cardboard 62 is dropped into the slit 26 between the front and rear panels 12, 14 where it is supported in a substantially vertical position by the elongated support bar 42 with a lower portion 66 of the sheet 62 received in the slit 26 and an upper portion 68 protruding from the slit 26. While a relatively small sheet of cardboard 62 is shown for ease of illustration, the slit 26 is open at both ends 70 so that a sheet which is larger than the jig 10 can be scribed in the jig 10 by moving it lengthwise in the slit 26. The sheet of cardboard 62 is then scored along a line 72 by running a suitable scoring tool 74 along the upper scribing edge 40 of the front panel 12. Thus, the distance between the scored line 72 and the bottom 76 of the sheet 62 is the same as the distance selected in this position between the top 64 of the support bar 42 and the upper scribing edge 40 of the front panel 12. In order to make boxes and lids, the sheet of cardboard 62 is then rotated and this procedure repeated on all four sides with the support bar 42 in the same position, but this is not necessary for other scribing applications. While it is advantageous for most applications that the jig 10 be relatively thin as shown, it can be made with different dimensions and can be used to scribe a variety of other types of sheet material. As mentioned above, the term "scribing" is used herein as including marking, scoring or cutting the sheet material.

While the description of the sheet scribing jig 10 according to the invention has been given with respect to a preferred embodiment, it will be evident that various other modifications are possible without departing from the scope of the invention as understood by those skilled in the art and as defined in the following claims.

The embodiments of the invention in which an exclusive property or privilege is claimed is defined as follows:

1. A jig for scribing a sheet along a straight line, the sheet having a bottom and the line being spaced a selected distance from the bottom of the sheet, comprising;
   (a) a rear panel,
   (b) a front panel having a straight upper scribing edge, the front panel extending substantially parallel to and spaced from the rear panel to form a slit therebetween, the slit being of sufficient width and having an open top to receive the sheet therein, and
   (c) an elongated support bar extending longitudinally in the slit formed between the front and rear panels to support the sheet thereon with a lower portion of the sheet received in the slit and an upper portion of the sheet protruding from the slit, the support bar having a plurality of predetermined positions to provide the selected distance between the support bar and the upper scribing edge of the front panel.

2. A sheet scribing jig as claimed in claim 1 wherein the rear panel has mounting means to secure the sheet scribing jig in a position with the slit formed between the front and rear panel extending substantially vertically and the support bar extending substantially horizontally in the slit.

3. A jig for scribing a sheet along a straight line, the sheet having a bottom and the line being spaced a selected distance from the bottom of the sheet, comprising;
   (a) a rear panel having mounting means to secure the sheet scribing jig in a vertical position,
   (b) a front panel having a straight upper scribing edge, the front panel extending substantially parallel to and spaced from the rear panel to form a slit therebetween, the slit being of sufficient width and having an open top to receive the sheet therein, the front panel having a first spaced pair of vertically extending matching openings therethrough, each of the first pair of vertically extending openings having a plurality of slots extending sideways therefrom in predetermined locations,
   (c) an elongated support bar extending longitudinally and horizontally in the slit formed between the front and rear panels to support the sheet thereon with a lower portion of the sheet received in the slit and an upper portion of the sheet protruding from the slit, the support bar having a first pair of studs extending forwardly therefrom, each of the first pair of studs extending through one of the first vertically extending openings in the front panel, whereby the first pair of studs are received in a matching pair of the slots extending from the first pair of vertically extending openings to locate the support bar in one of the plurality of predetermined positions to provide the selected distance between the support bar and the upper scribing edge of the front panel.

4. A sheet scribing jig as claimed in claim 3 wherein each of the first pair of studs is threaded to received a threaded retaining knob thereon, the threaded knobs being manually tightenable against the front panel to secure the support bar in the selected position.

5. A sheet scribing jig as claimed in claim 4 wherein the rear panel has a second spaced pair of vertically extending openings therethrough matching the first pair of vertically extending openings through the front panel, and the support bar has a second pair of studs extending rearwardly therefrom, each of the second pair of studs extending through one of the second pair of vertically extending openings in the rear panel and having an enlarged head on the outside of the rear panel to limit the width of the slit between the front and rear panels.

6. A sheet scribing jig as claimed in claim 5 wherein each of the second pair of studs is threaded to a shoulder to receive a nut to form the enlarged head.

* * * * *